US 11,938,763 B2
(12) United States Patent
Furu et al.

(10) Patent No.: US 11,938,763 B2
(45) Date of Patent: Mar. 26, 2024

(54) ANTI-SKID DEVICE

(71) Applicant: AFFIN AS, Oslo (NO)

(72) Inventors: Harald Furu, Oslo (NO); Christian Abry, Bekkestua (NO); Emil Abry, Hosle (NO); Christopher John Kavanagh, Oslo (NO)

(73) Assignee: AFFIN AS, Oslo (NO)

( * ) Notice: Subject to any disclaimer, the term of this patent is extended or adjusted under 35 U.S.C. 154(b) by 0 days.

(21) Appl. No.: 18/282,806

(22) PCT Filed: Apr. 13, 2022

(86) PCT No.: PCT/NO2022/050088
§ 371 (c)(1),
(2) Date: Sep. 19, 2023

(87) PCT Pub. No.: WO2022/225401
PCT Pub. Date: Oct. 27, 2022

(65) Prior Publication Data
US 2024/0034110 A1 Feb. 1, 2024

(30) Foreign Application Priority Data
Apr. 19, 2021 (NO) .................................. 20210487

(51) Int. Cl.
*B60C 27/02* (2006.01)
(52) U.S. Cl.
CPC ........ *B60C 27/0223* (2013.01); *B60C 27/023* (2013.01); *B60C 27/0261* (2013.01)
(58) Field of Classification Search
CPC .............. B60C 27/0223; B60C 27/023; B60C 27/0261
See application file for complete search history.

(56) References Cited

U.S. PATENT DOCUMENTS 2,454,005 A * 11/1948 Pletch .................... B60C 27/22
152/220
2,575,263 A * 11/1951 Eisenhauer, Sr. ... B60C 27/0238
152/217
(Continued)

FOREIGN PATENT DOCUMENTS

CN         209904464       1/2020
EP          0030521        6/1981
(Continued)

OTHER PUBLICATIONS

International Search Report Issued in PCT/No. 2022/050088, dated Jul. 6, 2022, pp. 1-2.
(Continued)

*Primary Examiner* — Scott A Browne
(74) *Attorney, Agent, or Firm* — Jeffrey S. Melcher; Melcher Patent Law PLLC

(57) ABSTRACT

This present invention relates to an anti-skid device adapted to being mounted on tyres of the vehicle wheels to provide traction and wheel to ground contact enhancement in snowy and icy conditions. The device includes a central housing 2 from which protrudes radially three arms 3 which are extended at the outer end by anti-slip components 10 transversally embracing the tread of the tyre. The anti-skid device have a locking mechanism that consists of a locking element 24 with teeth engaging with teeth on the inner circumference of the housing 2. A handle 16 integrated into the hub 4 interfaces with the locking element 24 to securely maintain the locked status when the device is mounted onto the wheel.

8 Claims, 9 Drawing Sheets

(56) References Cited

U.S. PATENT DOCUMENTS

| | | | |
|---|---|---|---|
| 2,873,783 A | 2/1959 | Higgins | |
| 4,209,049 A | 6/1980 | Regensburger | |
| 4,405,006 A * | 9/1983 | Preusker | B60C 27/14 |
| | | | 152/218 |
| 4,735,248 A | 4/1988 | Cizaire | |
| 4,834,158 A | 5/1989 | Katz | |
| 6,053,227 A | 4/2000 | Robeson | |
| 6,341,635 B1 * | 1/2002 | Robeson | B60C 27/045 |
| | | | 152/218 |
| 2011/0094643 A1 * | 4/2011 | Reil | B60C 27/04 |
| | | | 152/216 |
| 2022/0410643 A1 * | 12/2022 | Abry | B60C 27/023 |

FOREIGN PATENT DOCUMENTS

| | | |
|---|---|---|
| EP | 0110838 | 10/1983 |
| EP | 2050590 | 10/2007 |
| KR | 20040091223 | 10/2004 |
| NO | 20191262 | 1/2021 |
| WO | 2018/145673 | 8/2018 |
| WO | 2021/080435 | 4/2021 |

OTHER PUBLICATIONS

Written Opinion Issued in PCT/No. 2022/050088, dated Jul. 6, 2022, pp. 1-6.

* cited by examiner

ANTI-SKID DEVICE

FIELD OF THE INVENTION

This invention relates generally to an anti-skid device for use in connection with vehicle wheels to improve traction in snow and ice. In particular, it relates to an anti-skid device having a plurality of at least three arms comprising anti-slip elements intended to be arranged on the tread surface of the tire, operating means to allow the extension or contraction of said arms, where said operating means are equipped with locking means preventing extension of arms when the anti-slip elements are engaged.

DESCRIPTION AND DRAWBACKS OF PRIOR ART

A variety of anti-skid devices are available for mounting on vehicle tyres to enhance friction under extreme snow and ice conditions. Snow chains have been the standard for many years, though effective, they suffer from several disadvantages. Some of the disadvantages with such chains is that they are heavy, cumbersome, noisy in contact with bare pavement or with the inside of the fenders and require jacking-up the car to mount on wheels. A motorist faced with all these difficulties tends to leave the chains mounted even in ice and snow-free roads and this results in an accelerated rate of wear of the chains. In addition, these kinds of devices take up valuable space when not in use. To overcome the limitations of traditional snow chains, other types of anti-skid devices have been invented, these are devices composed of a plurality of arms radiating from a central housing, each arm is linked to a hook-like anti-slip component which extends transversally over the tread of the tyre. Examples of such devices are described in the following patents: (1) EP2050590B1, (2) U.S. Pat. No. 4,209,049A, (3) U.S. Pat. No. 4,834,158A, (4) U.S. Pat. No. 2,873,783A, (5) U.S. Pat. No. 4,735,248A, (6) U.S. Pat. No. 6,053,227, (7) EP0110838 and (8) KR 20040091223. Although these anti-skid devices fulfil their intended purposes, they suffer from several shortcomings, they are complex, cumbersome, made of many parts, expensive to manufacture, difficult to place upon the wheel, heavy, and take up space when not in use. In general, they lack simplicity. It is therefore an object of the present invention to overcome many of the disadvantages of the prior art and to present to the market an anti-skid device that is simple, effective and efficient, compact, lightweight and cheap to manufacture.

The invention may also contribute to less formation of floating dust. This kind of dust is of particular concern with the standard studded tyres used in the winter, as the invention will encourage drivers to opt for non-studded tires instead, using the invention to help overcoming adverse icy conditions.

SUMMARY OF INVENTION

The primary object of this invention is to provide an anti-skid device which is easy to mount and dismount from the wheel without the need of skills, physical strength or a separate tool.

Another object of the invention is to provide an anti-skid device which is simple, compact and made of few parts.

Another object of this invention is to provide an anti-skid device which can be mounted from the front face of the wheel and can be adapted to different wheel sizes.

Another object of this invention is to provide an anti-skid device which remains fastened even if the wheel changes diameter due to the flattening of the tyre at the wheel-ground contact.

These and other objectives are achieved by providing the device with locking elements that keeps the device fastened to the wheel during use.

DETAILED DESCRIPTION OF THE DRAWINGS

Figure 1:
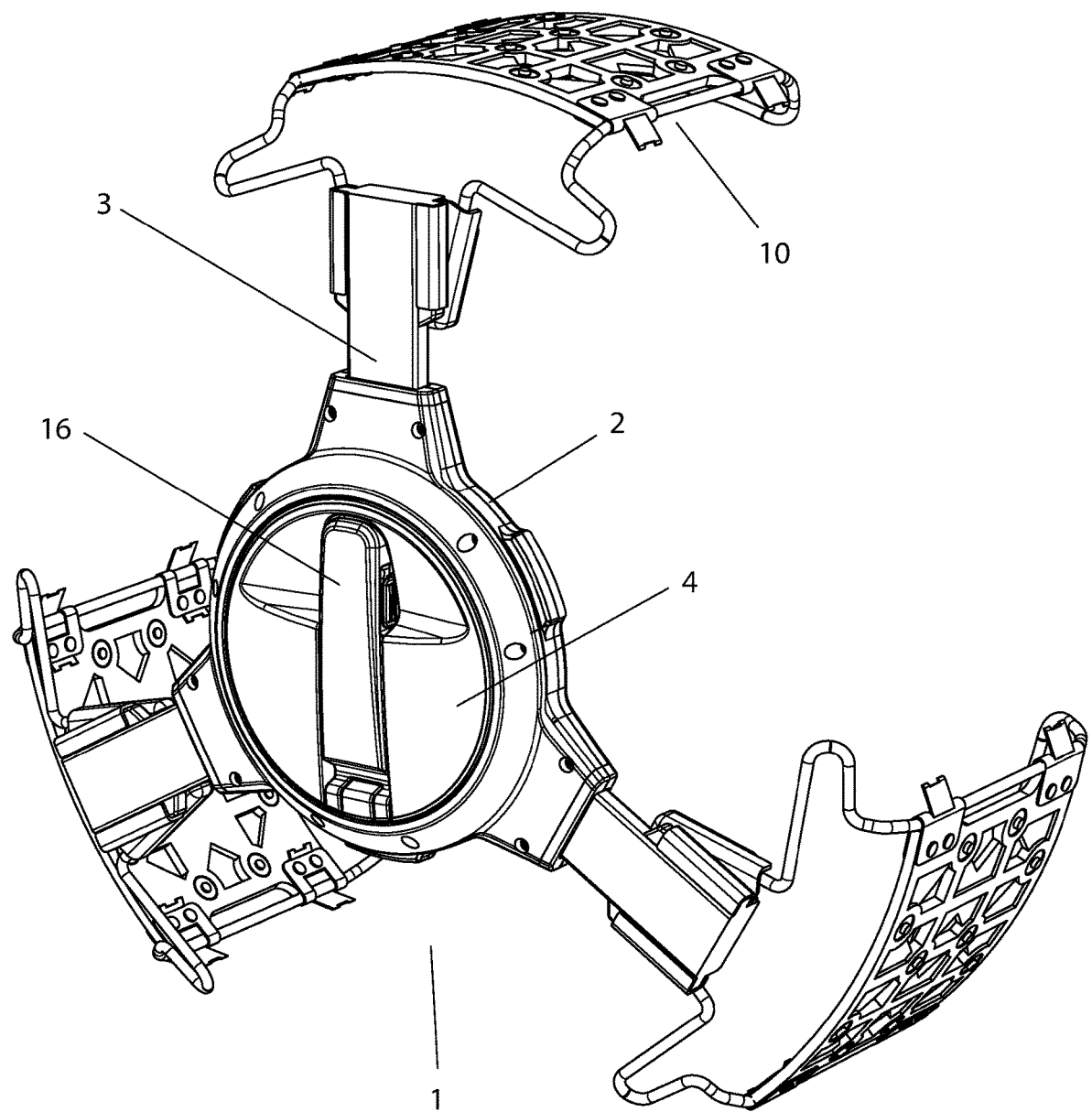
FIG. 1 is a front view of the anti-skid device.

Referring to FIG. 1 there is shown an anti-skid device 1 according to the invention. The device 1 consists of a housing 2 and three arms 3. Although three arms are shown in the drawings it should be understood that there may be four or more arms. The housing encloses the inner ends the arms 3 and the mechanism for operating the arms. A hub 4 is rotatable in the housing 2. The hub has a shaft 32 (see FIG. 2) that is connected to a pinion that in turn enables the arms to move outwards resp. inwards. These details are more fully described in our previous application No. 20191262 and will not be further discussed here since they do not form a part of the present invention.

At the outer end of each arm 3 there are anti-slip elements 10 (see FIGS. 1, 7-9).

Figure 2:
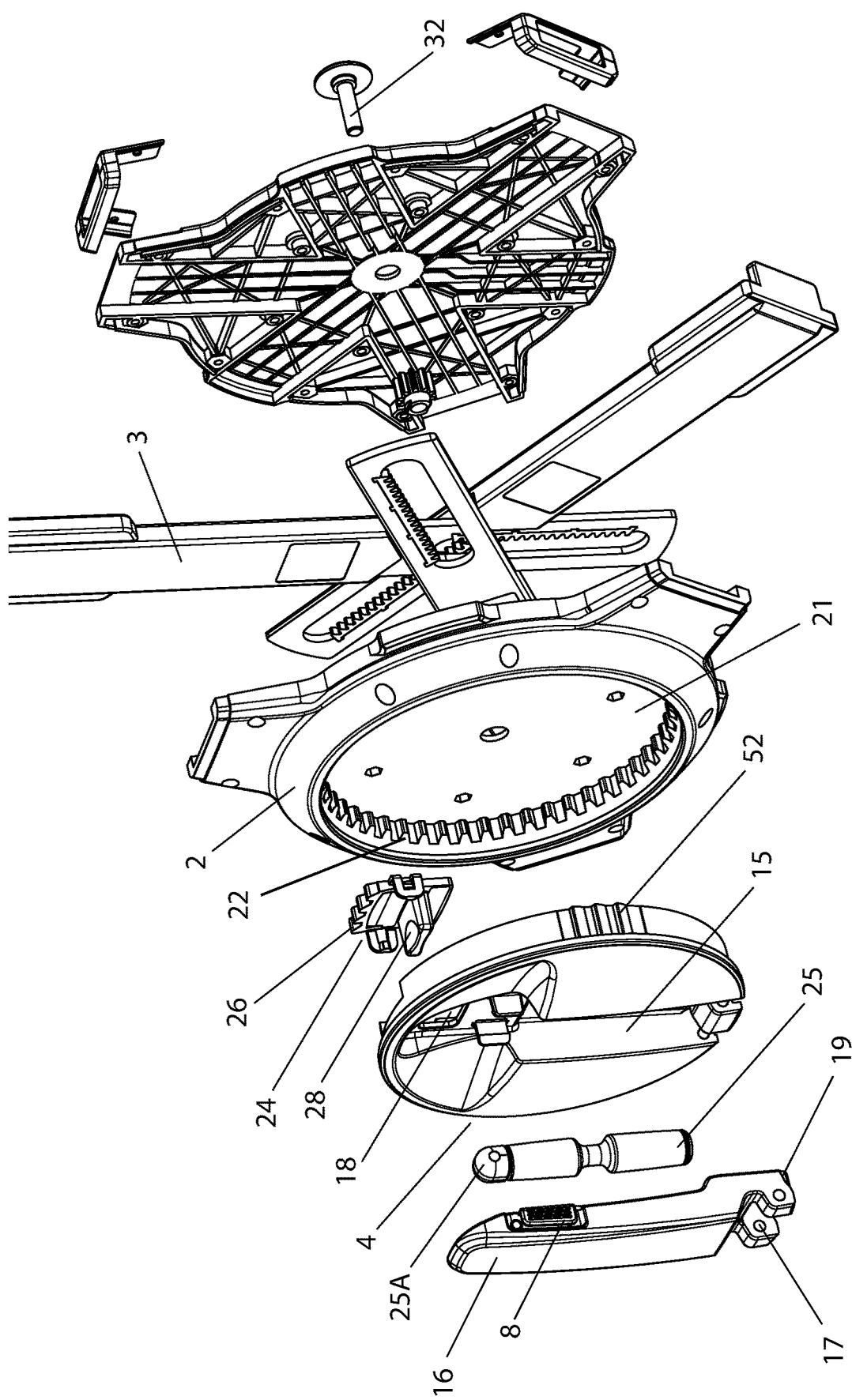
FIG. 2 is an exploded view of the device with the wheel grips removed.

Referring now to FIG. 2 the hub has a recess 15. A handle 16 has at one end a hinge 17 enabling the handle to be folded into the recess 15. There is also an opening 18 through the hub. At the other (distal) end of the handle there are means that interfaces with a locking mechanism. This will be described in more detail later.

The handle is folded into the recess when in its locked position. It is also folded when not in use, for example during transport. The handle may include a release element 8 with a catch that can be operated in order to swing the handle outwards. This is an additional safety feature to avoid accidental folding out of the handle 16.

A crank 25, located within the handle when not in use, can be swung outwards and is used to rotate the hub 3 and via the axle 32 used to operate the inwards or outwards movement of the arms 3. The crank 25 is hinged to the handle 16 on a pivoting base 25A that interface with the locking mechanism as described further below.

The housing 3 has a circular recess 21 accommodating the hub 4. The housing has an inner diameter that is slightly larger than the outer diameter of the hub 4 enabling the hub 4 to rotate in the housing 2 on the axle 32. The inner circumference of the housing 3 is equipped with multiple protrusions or teeth 22.

A locking element 24 is held below and protrudes through the recess 18 in the hub 4. Locking element 24 is equipped with a number of protrusions or teeth 26 along a peripheral edge that can interface with corresponding teeth 22 in the housing 2. On the side 27 facing towards the user a rib 28 protrudes outwards and divides the facing side 27 into upper and lower areas. Whilst locking element 24 is positioned between hub 4 and housing 2, the rib 28 penetrates window 18 and is thus accessible to the user. Rib 28 thus acts as a sliding lever that allows the user to manually move the locking element 24 into or out of contact with the ring teeth 22.

In addition, the geometry of the interacting components is such that the handle 16 and crank 25 may not be properly closed when the locking element 24 is in the Open position, as the pivoting base 25A of the crank will crash with rib 28 of the Lock while the Lock is in Open position. More clearly, the locking element 24 must be locked in order to be able to close the device such that it is ready for use—an additional safety feature.

When handle 16 is opened outwards the locking element 24 is free to move.

In a preferred embodiment the two areas visible on either side or rib 28 are colour coded so that the operator can determine the state of the locking element. For example, green for the side closest the center of the hub and red for the side away from the center. When the locking element is in either the locked or open positions, only one of these colours will visible, thus clearly indicating the status of the device.

Figure 3:
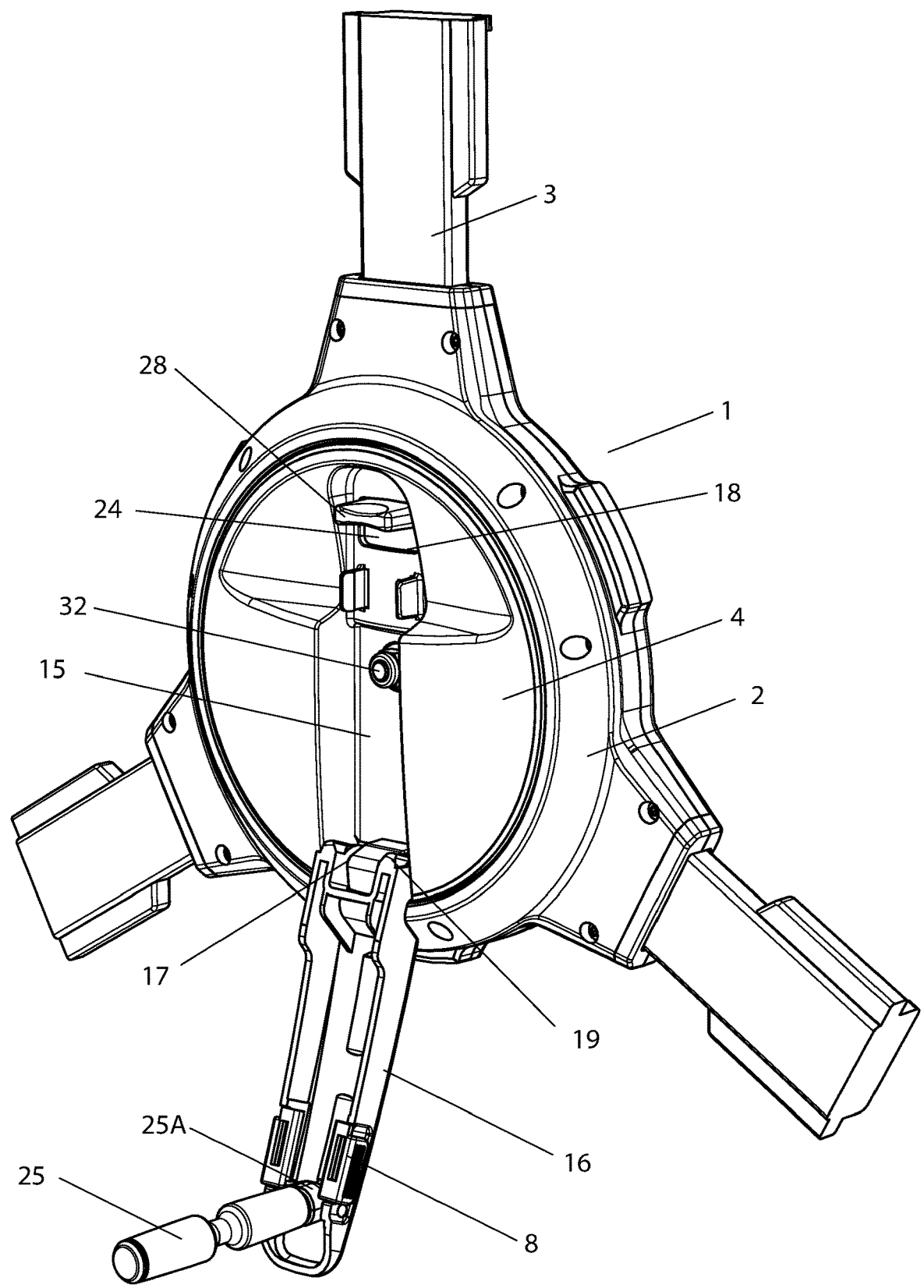
FIG. 3 is a front view of the anti-skid device with the handle opened.

FIG. 3 shows a front view of the device in the operating position. The handle 16 has been folded out from the recess 15. The crank 25 is at its end 25A hinged to the handle and when swung out, as shown in FIG. 3 is used to turn the hub which in turn operates the arms. FIG. 3 shows the locking element 24 engaged with the teeth 22 in the housing with the rib 28 protruding through the window 18, i.e. in locked position. Prior to operation of the handle the locking element 24 is disengaged, thus enabling the hub to be turned.

Figure 4:
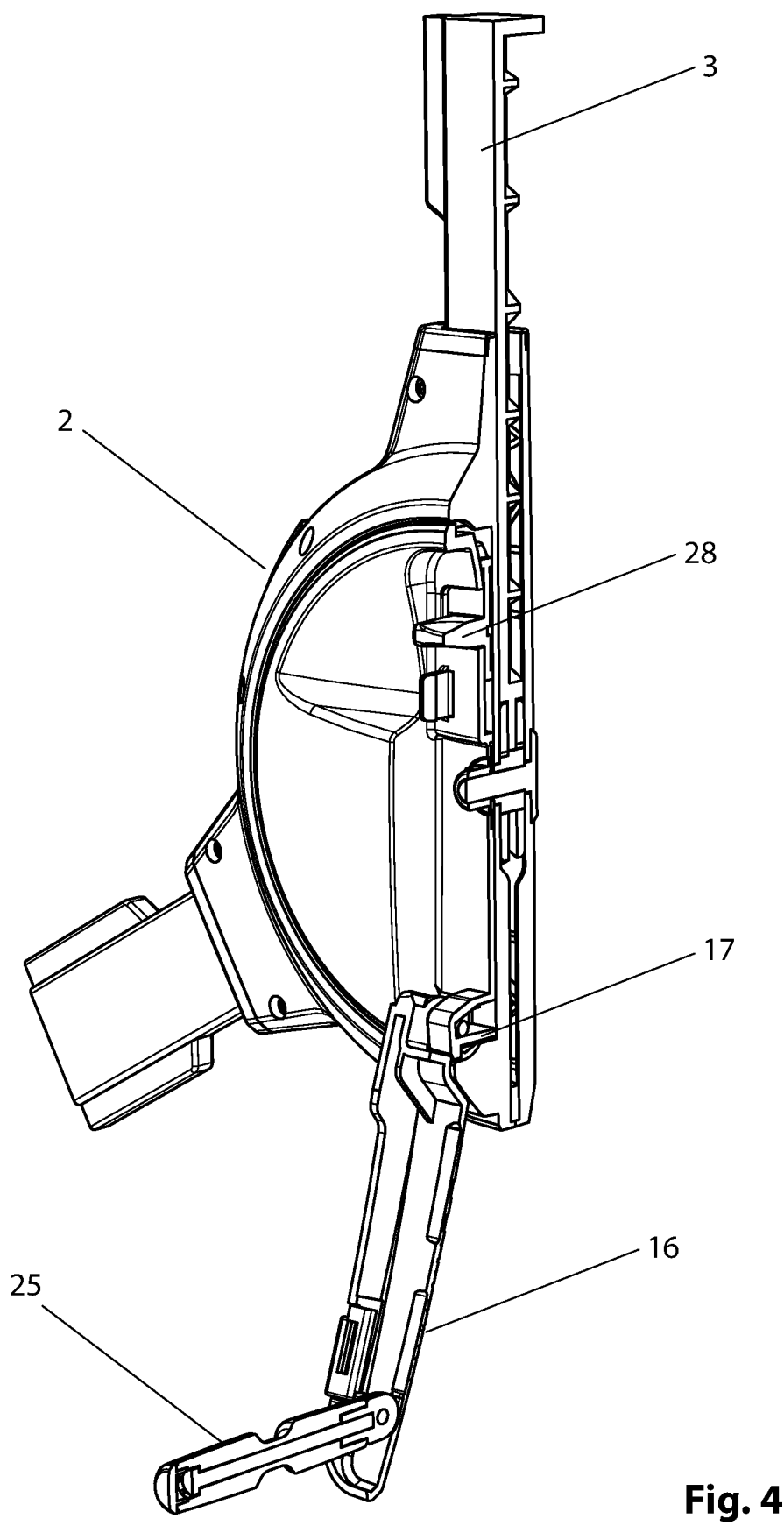
FIG. 4 is a vertical section of the hub with the handle opened.

FIG. 4 is a side view of the hub and housing shown in FIG. 3. As can be seen, the locking element 24 has now been pushed out of engagement with the housing teeth 22 and rib 28 is at the end of recess 18 nearest the center of the device.

Figure 5:
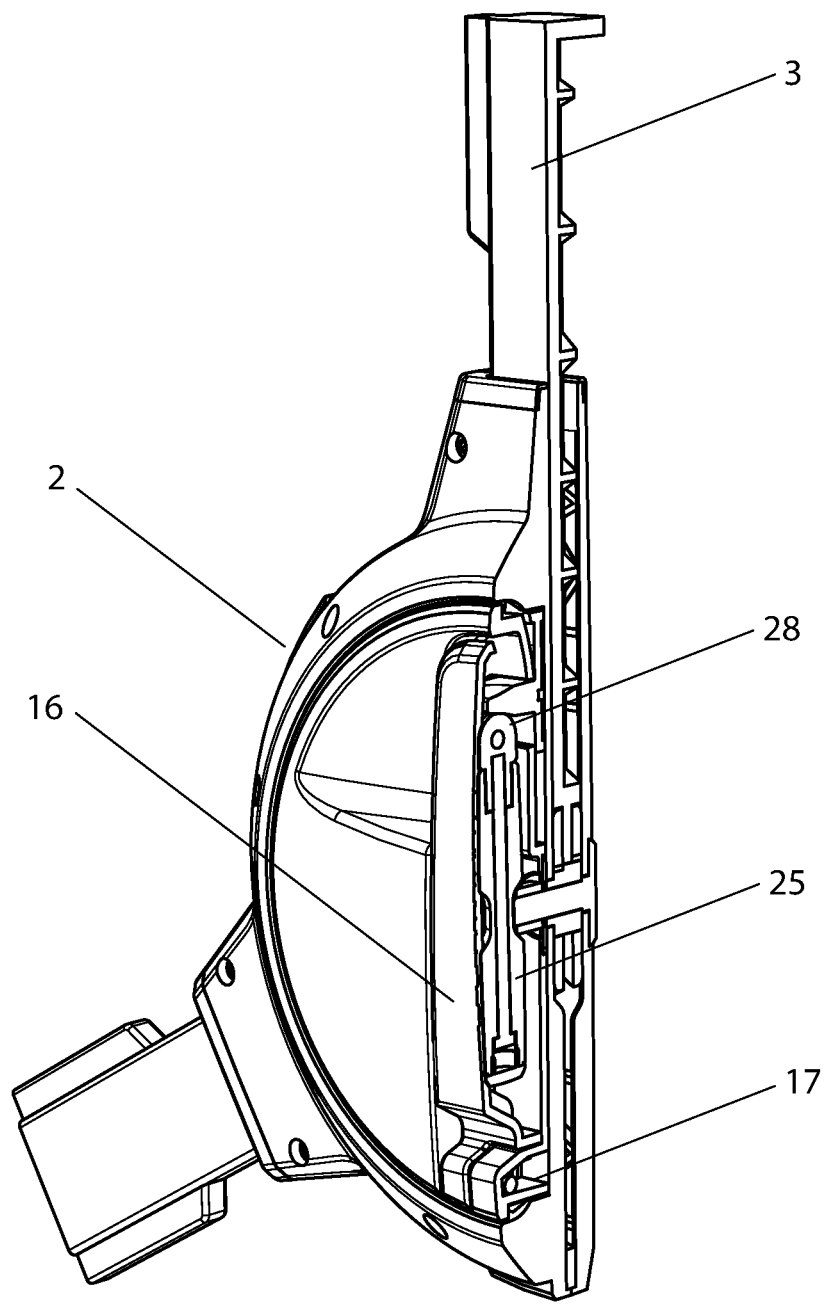
FIG. 5 is a vertical section of the hub with the handle closed.

FIG. 5 is a side view of the hub showing the handle and crank folded back into the recess 15. In this locked position, the handle 25 and pivot 25A fit underneath the rib 28 of the locking element 24. The hub 4 is now secured against rotation.

Figure 6:
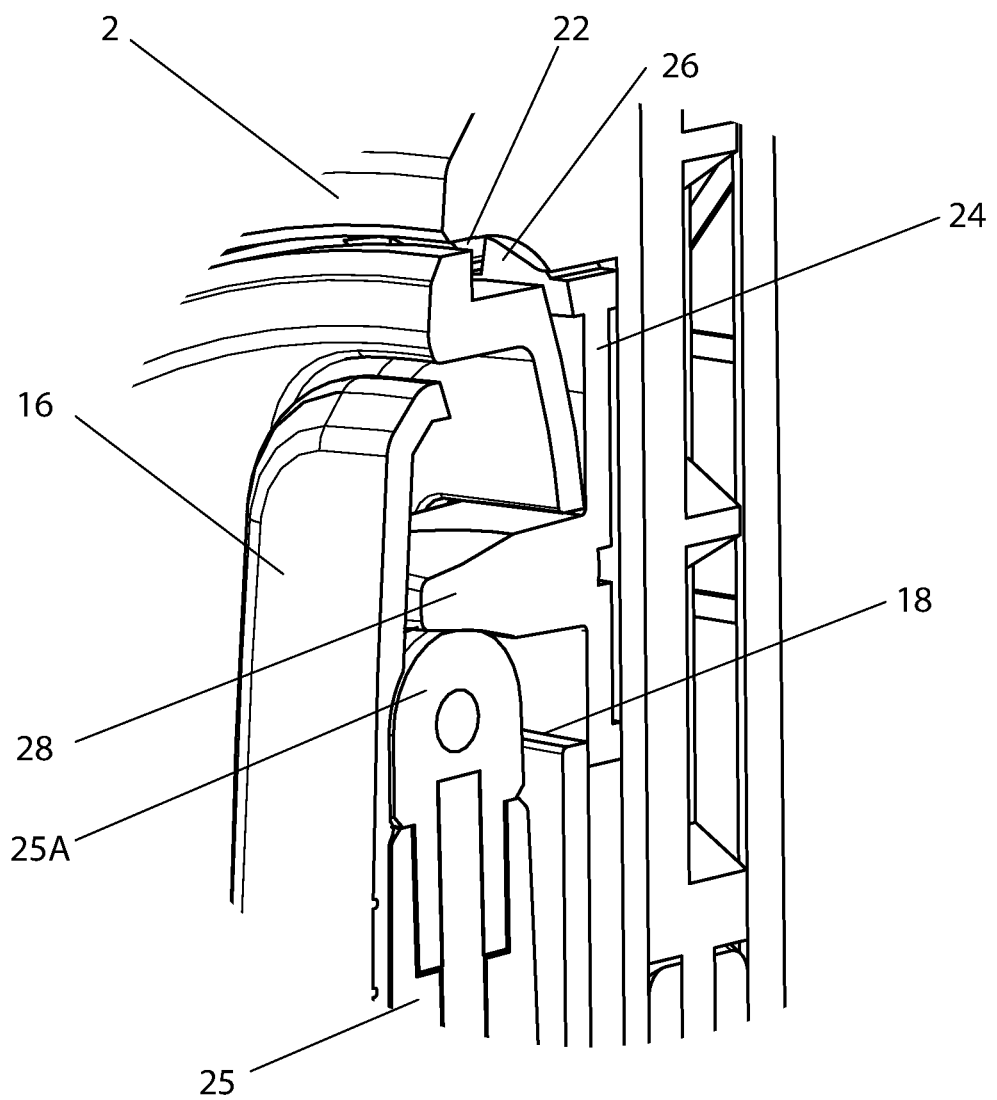
FIG. 6 is a detail of FIG. 5.

In FIG. 6 there is shown a detail of FIG. 5 showing the method of holding the locking element 24 in a secured position. The rib 28 that protrudes through the window 18 interfaces with end 25A of crank 25. Crank 25 is pushed so that its end 25A is under the rib 28. Then when handle 16 is closed the locking element is held in contact with teeth 22, i.e., its locking position. Buttons 8 secure the handle 16 to the hub 4 so that the handle 16 may not open accidentally while driving.

In addition to the teeth on the Lock, 2 additional teeth 19 are integrated with the lower pivoting end of the handle 16 close to hinge 17. When the handle 16 is moved to the closed position, the teeth will form an additional mechanical lock with the teeth 22 in the housing.

The hub 4 may also be equipped with one or more flexible teeth elements 52 made of an elastomer or a rubber, visible in FIG. 2. These will not overmuch hinder the rotation of the hub 4 but will provide a more positive feel/clicking when the user rotates the handle in order to help match/position the teeth during locking. In addition, these flexible teeth elements 52 may provide a braking function in the event that the entire system is positioned very tightly. i.e. When the user starts to unlock the centre hub 4, an undesired reverse rotation may occur as the arms 3 move immediately outwards. Such an unexpected movement may startle the user, and the flexible teeth elements 52 may effectively dampen such a movement.

The operation of the device is as follows: When not in use the device is stored in the boot of the car. When it is needed the device will be placed beside the wheel and the handle & crank swung open. Then the crank is used to first turn the hub anti clockwise to extend the arms 3 outwards such that the device can be mounted onto the wheel. When in place around the tyre the crank 25 will be turned in the clockwise direction to retract the arms 3 until the anti-slip elements fit tightly around the rim of the wheel. When the operator is satisfied that the anti-slip elements have fully engaged with the tyre, he or she will move the locking element 24 into engagement with the teeth 22. The locked status may be verified by observing the face of the locking element showing green. Then the user can move the crank back into the handle and handle folds back into the recess. Thus the anti-slip elements are held in place. Upon completion of the journey the same process is utilised in reverse.

The same procedure is used to mount a second device on the other driving wheel. While it is not foreseen that it should be necessary to use the device on all four wheels of a 4-wheel drive car, it may at times be necessary since some 4-wheel drive cars will adjust the power to the driving axle that has the least resistance. Referring to FIG. 1 there is shown an anti-skid device 1 according to the invention. The device 1 consists of a housing 2 and three arms 3. Although three arms are shown in the drawings it should be understood that there may be four or more arms. The housing encloses the inner ends the arms 3 and the mechanism for operating the arms. A hub 4 is rotatable in the housing 2. The hub has a shaft 32 (see FIG. 2) that is connected to a pinion that in turn enables the arms to move outwards resp. inwards. These details are more fully described in our previous application No. 20191262 and will not be further discussed here since they do not form a part of the present invention.

At the outer end of each arm 3 there are anti-slip elements 10 (see FIGS. 1, 7-9).

Referring now to FIG. 2 the hub has a recess 15. A handle 16 has at one end a hinge 17 enabling the handle to be folded into the recess 15. There is also an opening 18 through the hub. At the other (distal) end of the handle there are means that interfaces with a locking mechanism. This will be described in more detail later.

The handle is folded into the recess when in its locked position. It is also folded when not in use, for example during transport. The handle may include a release element 8 with a catch that can be operated in order to swing the handle outwards. This is an additional safety feature to avoid accidental folding out of the handle 16.

A crank 25, located within the handle when not in use, can be swung outwards and is used to rotate the hub 3 and via the axle 32 used to operate the inwards or outwards movement of the arms 3. The crank 25 is hinged to the handle 16 on a pivoting base 25A that interface with the locking mechanism as described further below.

The housing 3 has a circular recess 21 accommodating the hub 4. The housing has an inner diameter that is slightly larger than the outer diameter of the hub 4 enabling the hub 4 to rotate in the housing 2 on the axle 32. The inner circumference of the housing 3 is equipped with multiple protrusions or teeth 22.

A locking element 24 is held below and protrudes through the recess 18 in the hub 4. Locking element 24 is equipped with a number of protrusions or teeth 26 along a peripheral edge that can interface with corresponding teeth 22 in the housing 2. On the side 27 facing towards the user a rib 28 protrudes outwards and divides the facing side 27 into upper and lower areas. Whilst locking element 24 is positioned between hub 4 and housing 2, the rib 28 penetrates window 18 and is thus accessible to the user. Rib 28 thus acts as a sliding lever that allows the user to manually move the locking element 24 into or out of contact with the ring teeth 22.

In addition, the geometry of the interacting components is such that the handle 16 and crank 25 may not be properly closed when the locking element 24 is in the Open position, as the pivoting base 25A of the crank will crash with rib 28 of the Lock while the Lock is in Open position. More clearly, the locking element 24 must be locked in order to be able to close the device such that it is ready for use—an additional safety feature.

When handle 16 is opened outwards the locking element 24 is free to move.

In a preferred embodiment the two areas visible on either side or rib 28 are colour coded so that the operator can determine the state of the locking element. For example green for the side closest the center of the hub and red for the side away from the center. When the locking element is in either the locked or open positions, only one of these colors will visible, thus clearly indicating the status of the device.

FIG. 3 shows a front view of the device in the operating position. The handle 16 has been folded out from the recess 15. The crank 25 is at its end 25A hinged to the handle and when swung out, as shown in FIG. 3 is used to turn the hub which in turn operates the arms. FIG. 3 shows the locking element 24 engaged with the teeth 22 in the housing with the rib 28 protruding through the window 18, i.e. in locked position. Prior to operation of the handle the locking element 24 is disengaged, thus enabling the hub to be turned.

FIG. 4 is a side view of the hub and housing shown in FIG. 3. As can be seen, the locking element 24 has now been pushed out of engagement with the housing teeth 22 and rib 28 is at the end of recess 18 nearest the center of the device.

FIG. 5 is a side view of the hub showing the handle and crank folded back into the recess 15. In this locked position, the handle 25 and pivot 25A fit underneath the rib 28 of the locking element 24. The hub 4 is now secured against rotation.

In FIG. 6 there is shown a detail of FIG. 5 showing the method of holding the locking element 24 in a secured position. The rib 28 that protrudes through the window 18 interfaces with end 25A of crank 25. Crank 25 is pushed so that its end 25A is under the rib 28. Then when handle 16 is closed the locking element is held in contact with teeth 22, i.e., its locking position. Buttons 8 secure the handle 16 to the hub 4 so that the handle 16 may not open accidentally while driving.

In addition to the teeth on the Lock, 2 additional teeth 19 are integrated with the lower pivoting end of the handle 16 close to hinge 17. When the handle 16 is moved to the closed position, the teeth will form an additional mechanical lock with the teeth 22 in the housing.

The hub 4 may also be equipped with one or more flexible teeth elements 52 made of an elastomer or a rubber, visible in FIG. 2. These will not overmuch hinder the rotation of the hub 4 but will provide a more positive feel/clicking when the user rotates the handle in order to help match/position the teeth during locking. In addition, these flexible teeth elements 52 may provide a braking function in the event that the entire system is positioned very tightly. i.e. When the user starts to unlock the centre hub 4, an undesired reverse rotation may occur as the arms 3 move immediately outwards. Such an unexpected movement may startle the user, and the flexible teeth elements 52 may effectively dampen such a movement.

The operation of the device is as follows: When not in use the device is stored in the boot of the car. When it is needed the device will be placed beside the wheel and the handle & crank swung open. Then the crank is used to first turn the hub anti clockwise to extend the arms 3 outwards such that the device can be mounted onto the wheel. When in place around the tire the crank 25 will be turned in the clockwise direction to retract the arms 3 until the anti-slip elements fit tightly around the rim of the wheel. When the operator is satisfied that the anti-slip elements have fully engaged with the tire he or she will move the locking element 24 into engagement with the teeth 22. The locked status may be verified by observing the face of the locking element showing green. Then the user can move the crank back into the handle and handle folds back into the recess. Thus the anti slip elements are held in place. Upon completion of the journey the same process is utilised in reverse.

The same procedure is used to mount a second device on the other driving wheel. While it is not foreseen that it should be necessary to use the device on all four wheels of a 4-wheel drive car, it may at times be necessary since some 4-wheel drive cars will adjust the power to the driving axle that has the least resistance.

Figure 7:
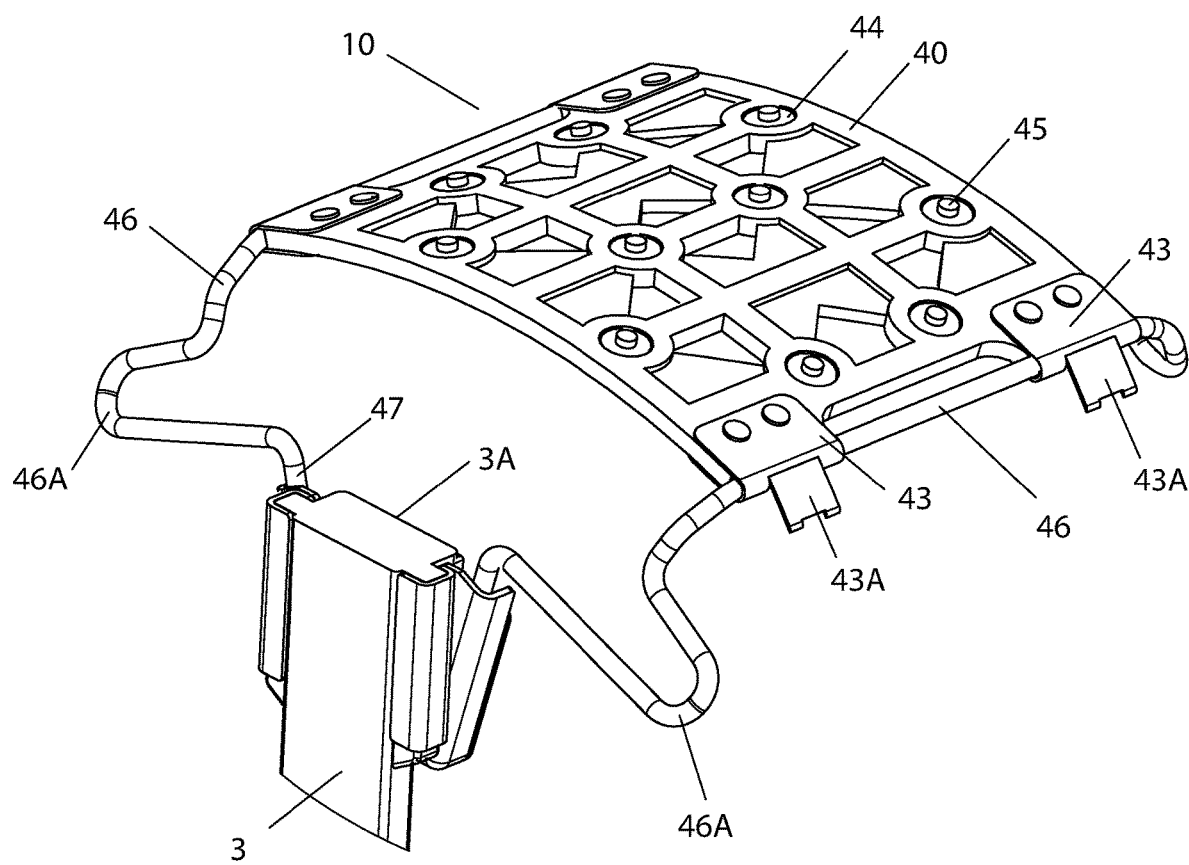
FIG. 7 shows a first embodiment of a wheel grip.

Referring now to FIG. 7, the anti-slip element 10 consists of a pad 40 that is equipped with multiple raised studs 45 irregularly spaced, protruding from both the inner and the outer surfaces to increase friction with the ground, and to prevent any circumferential movement of the anti-slip components along the tyre tread. The friction pads 40 are preferably made in a flexible rubberlike material e.g. TPU Thermoplastic Polyurethane. The pads are held in a steel hoop wire structure 42 by encompassing metal brackets 43 in the corners. The metal brackets advantageously include a forwards and backwards facing structure 43A that engages with the rubber tyre when the weight of the car is applied ie. the pads are between tyre and ground. The forwards and backwards facing structures 43A prevent the pads slipping on the tyres (more clearly visible in FIG. 9). The studs 45 are preferably metal, and have a wider area on each side e.g. A washer 44 prevents the stud 45 being pulled out/rotating in an undesirable manner. A wire hoop 46 surrounds the pads and provides a lightweight, resilient pad assembly, preferably made of spring steel, and may be produced economically.

Figure 8:
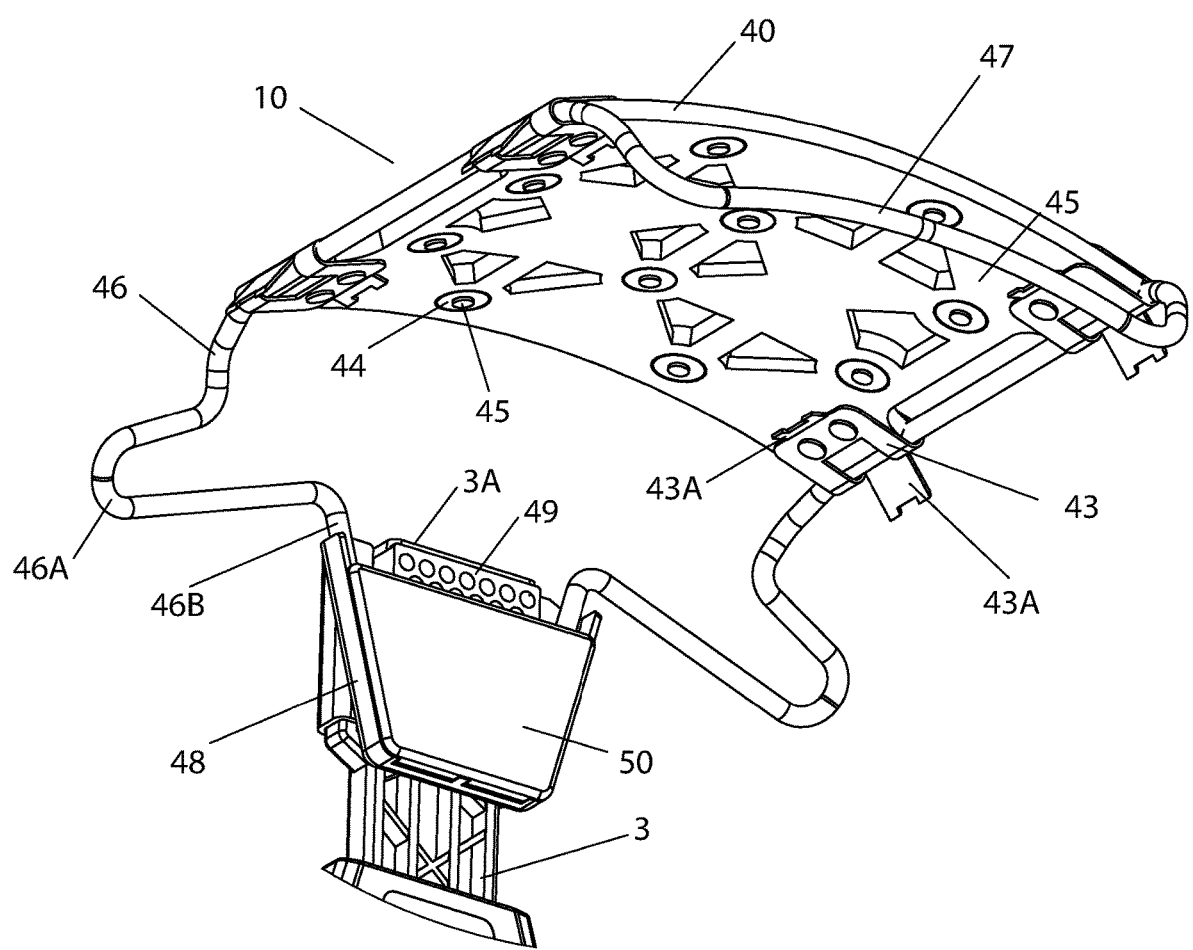
FIG. 8 shows a second embodiment of a wheel grip.

FIG. 8 shows an underside view of the anti-slip element 10. The hook/retention detail 47 (shown in FIG. 8) is formed in the hoop 46 to hold the device 1 into the wheel by gripping on the inner surface of the wheel, thus preventing the device 1 from moving outwards. The shape of the hoop in areas 46A also adds extra spring/flexing performance to absorb some of the forces/deformation caused by the tyre/weight of the car. The wire hoop is completed by a bracket 48 which allows a sliding connection to arms 3. The outward movement of bracket 48 and thus anti-slip element 10 is limited by a protrusion 3A on the ends of arms, thereby providing a secure connection between anti slip elements 10 and arms 3, but allowing the anti slip elements to be easily disconnected by the user by sliding these inwards towards hub 4. A flexor or spring element 49 is positioned such that it interacts with the underside of protrusion 3A to provide an inwards spring force acting on bracket 48 that maintains contact between the tyre and anti-slip element 10, even in the event that the tyre is locally depressed inwards by for example driving over a rock/kerb. This is more clearly detailed in our earlier application No. 20191262. A pad 50 covers the inner face of bracket 48 thus providing a forgiving surface positioned against the wheel.

Figure 9:
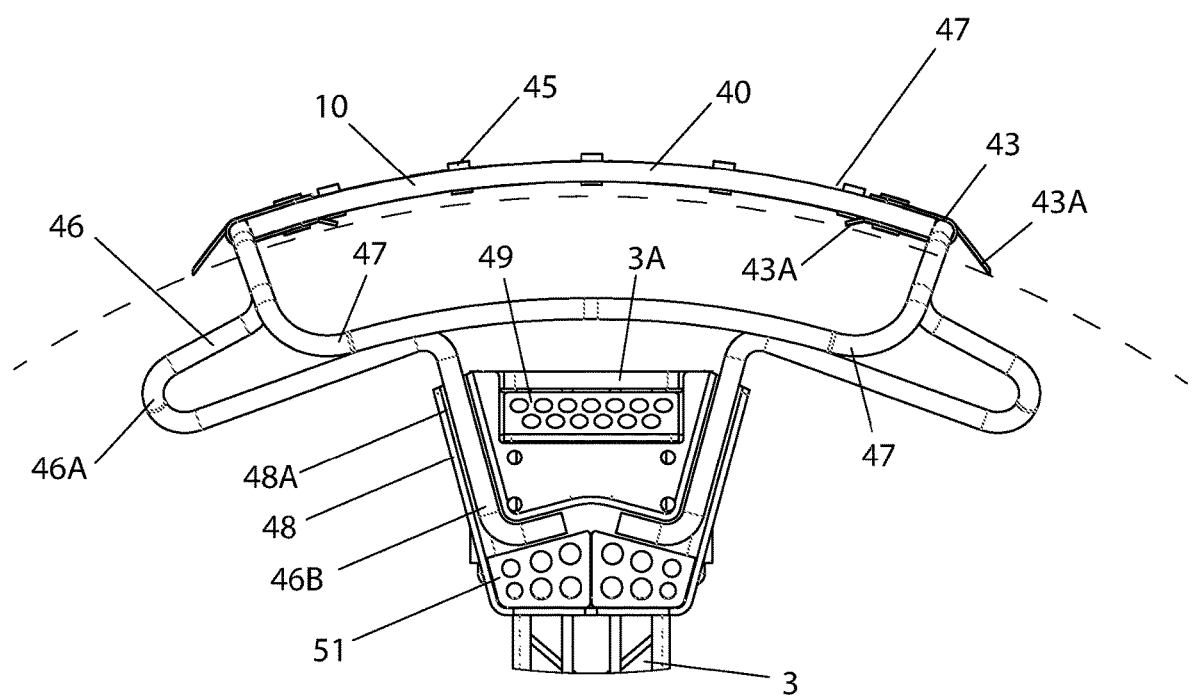
FIG. 9 is a side view of FIG. 8 with a cover component removed for clarity.

FIG. 9 shows a view of the anti grip element 10 with a partial section through metal bracket 48 to expose the interior. The ends 46B of the wire hoop 46 are retained in two U-shaped channels 48A in metal bracket 48 that is fitted to the end of the arm 3. This allows each wire end 46B to move in and outwards linearly thereby ensuring the anti-slip elements 10 stay close to the tyre surface during driving. The wire ends 46B are shaped so they cannot move up/outwards. In turn they press downwards on spring elements 51 which then return the wires to starting position once the tyre has rotated further. The independent movement of the individual wire ends 46B is an advantage as it means the car first drives over one end of the wire and this movement only affects that end, not trying to rotate the entire anti-slip element 10 as would be the case should the wire not be retained independently.

In this preferred embodiment, studs 45 can take the form of protuberances, but may also take the form of holes or local areas formed from a high friction material. Circumferential movement prevention is further enforced by the curved shape of the anti-slip element 40. An additional benefit of the curved shape is observed under braking conditions, where curved shape will mechanically engage with the deformable rubber of the tyre, thus not relying solely upon the friction created by the grip details. This is important in that it reduces the forces exerted upon arms 3 and housing 2 during braking. Undesired outwards movement of the anti-slip element 40 relative to the tyre is prevented by a return detail 47, cupping the inside wall of the tyre and preventing the device 1 from loosening from the tyre. This is particularly relevant in the case where a wheel spinning at higher speed while turning the car to the left or right may exert a combination of centrifugal and axial outwards forces on the device 1, requiring an extremely secure fastening of device 1 to the tyre. In alternate embodiments, return detail 47 may be replaced by one or more hook details, or a hinged flange detail able to be locked in a downwards position thus preventing outwards movement of anti-slip element 10. Anti-slip element 10 could also be formed in other ways to perform the same task without deviating from the spirit of the invention.

The invention claimed is:

1. An anti-skid device for enhancing traction on slippery roads comprising:
   a housing defining a cavity and having housing teeth along an inner periphery of the housing;
   at least three arms protruding radially from the housing;
   a hub rotatable within the cavity of the housing by a handle, the hub is configured to extend the at least three arms in a direction outward from the hub when the hub is rotated in a first direction and retract the at least three arms in a direction inward to the hub when the hub is rotated in a second direction opposing the first direction;
   each of the at least three arms having an associated anti-slip element extending from a side surface and being configured to contact a tread surface of the vehicle tire; and
   a lock comprising lock teeth configured to lock the hub in relation to the housing to prevent extension of the at least three arms when the anti-slip elements are engaged against the tire tread, wherein the lock comprises a locking element located between the hub and the housing, and the lock is movable between a first position where the lock teeth engage the housing teeth preventing rotation of the hub and a second position wherein the lock teeth are out of contact with the housing teeth allowing rotation of the hub.

2. The anti-skid device according to claim 1, wherein the locking element includes a rib protruding through a window in the hub.

3. The anti-skid device according to claim 1, wherein the handle includes a hinge.

4. The anti-skid device according to claim 3, wherein said hinge includes teeth arranged to interface with the teeth in the housing.

5. The anti-skid device according to claim 3, wherein the handle can be folded into a recess in the hub.

6. The anti-skid device according to claim 1, wherein each of the anti-slip elements is equipped on its inner and outer surfaces with multiple studs irregularly spaced.

7. The anti-skid device according to claim 6, wherein each of the anti-slip elements is held in a wire hoop with ends that fits into a bracket removably connected at the end of the arm.

8. The anti-skid device according to claim 1, wherein the anti-slip elements are detachable from the at least three arms for compact storage.

\* \* \* \* \*